US006776184B1

(12) United States Patent
Maichel et al.

(10) Patent No.: US 6,776,184 B1
(45) Date of Patent: Aug. 17, 2004

(54) INSERTION VALVE AND INSTALLATION METHOD

(75) Inventors: Jeffrey L. Maichel, Temecula, CA (US); Thomas A. Sovilla, La Habra, CA (US)

(73) Assignee: Occlude, La Mirada, CA (US)

( * ) Notice: Subject to any disclaimer, the term of this patent is extended or adjusted under 35 U.S.C. 154(b) by 0 days.

(21) Appl. No.: 10/376,552

(22) Filed: Feb. 28, 2003

(51) Int. Cl.[7] ............................................. F16K 43/00
(52) U.S. Cl. ........................... 137/318; 138/94; 138/97; 251/327; 251/328
(58) Field of Search ........................... 137/15.13, 15.14, 137/318, 375; 138/94, 97; 408/101, 102, 137, 138; 251/326, 327, 328, 329

(56) References Cited

U.S. PATENT DOCUMENTS

| | | | | |
|---|---|---|---|---|
| 587,107 | A | * 7/1897 | Sherrerd | ..................... 137/318 |
| 1,743,338 | A | 1/1930 | Field | |
| 1,805,710 | A | 5/1931 | Wilkins | |
| 1,898,935 | A | 2/1933 | Brandriff | |
| 2,899,983 | A | 8/1959 | Farris | |
| 3,650,547 | A | 3/1972 | Tickett | |
| 3,799,182 | A | * 3/1974 | Long | ........................... 137/318 |
| 3,948,282 | A | * 4/1976 | Yano | ........................... 137/318 |
| 4,483,514 | A | * 11/1984 | Kennedy | .................... 251/327 |
| 4,527,586 | A | * 7/1985 | Yano et al. | .................. 137/318 |
| 4,532,957 | A | * 8/1985 | Battle et al. | ................ 137/375 |
| 5,063,957 | A | * 11/1991 | Yano et al. | .................. 137/318 |
| 5,074,526 | A | * 12/1991 | Ragsdale et al. | ........... 137/318 |
| 5,183,364 | A | 2/1993 | Hardwig | |
| 5,316,037 | A | 5/1994 | Martin | |
| 5,327,923 | A | 7/1994 | Eischen et al. | |
| 5,611,365 | A | * 3/1997 | Maichel | ...................... 137/318 |
| 5,660,199 | A | * 8/1997 | Maichel | ...................... 137/318 |
| 5,676,171 | A | * 10/1997 | Heed | .......................... 137/318 |
| 5,732,728 | A | * 3/1998 | Maichel | ...................... 137/318 |
| 6,041,806 | A | 3/2000 | Maichel | |
| 6,308,726 | B2 | * 10/2001 | Sato et al. | ................... 137/318 |
| 6,357,471 | B1 | * 3/2002 | Sato et al. | ................... 137/318 |
| 6,470,907 | B1 | * 10/2002 | Sato et al. | ................... 137/318 |
| 6,530,389 | B2 | * 3/2003 | Sato et al. | ................... 137/318 |
| 2001/0010233 | A1 | * 8/2001 | Sato et al. | ................... 137/318 |
| 2002/0148503 | A1 | * 10/2002 | Sato et al. | ................... 137/318 |

OTHER PUBLICATIONS

Product Sheet of Mueller Co., Decatur, Illinois showing an H–800 Inserting valve.
Product Sheet of Mueller Co. showing a Resilient Wedge Gate Valve.
Product Sheet of Hydra–Stop, Inc., Blue Island, Illinois for an Insta–Valve.
Product Sheet of Romac Industries, Inc. for a QuikValve.
Product Sheet of Romac Industries, Inc. for an Inserta Valve.

* cited by examiner

Primary Examiner—George L. Walton
(74) Attorney, Agent, or Firm—Loyal McKinley Hanson (57) ABSTRACT

A valve assembly for insertion in a line formed by an existing pipe of predetermined outside diameter containing fluid under pressure includes a valve body with a bonnet-supporting flange that defines an access way into the valve body through which an installer can cut and remove a section of the existing pipe. A bonnet with a moveable gate having a width no less than the predetermined outside diameter of the pipe, includes a flange-mating portion that fits into the access way in a fluid-tight fit while defining a gate opening through which the gate moves into the valve body to a closed position in which the gate extends through the gate-receiving gap in the pipe and into fluid-tight engagement of the valve body. Installation is accomplished by (i) assembling the valve body over the existing pipe, (ii) mounting a temporary isolation valve on the bonnet-supporting flange, (iii) cutting and removing a section of the existing pipe through the isolation valve to form the gate-receiving gap in the pipe (iv) installing the bonnet through the isolation valve, and then (v) removing the isolation value up over the bonnet.

6 Claims, 9 Drawing Sheets

INSERTION VALVE AND INSTALLATION METHOD

BACKGROUND OF THE INVENTION

1. Technical Field

This invention relates generally to procedures and equipment for stopping an existing water, sewer, gas, or other line containing fluid under pressure, and more particularly to a valve assembly and installation method for inserting a valve in a line without otherwise shutting down the line during the insertion.

2. Description of Related Art

The task of inserting a valve in a line containing fluid under pressure (e.g., a municipal water line or natural gas line) without otherwise shutting down the line during the insertion can be expensive, inconvenient, and time consuming. Yet the need to do so is commonplace. Damaged fire hydrants, for example, frequently need replacement and doing so quickly in a cost-effective manner often involves shutting down water service while a valve is inserted in a water line branch feeding the fire hydrant.

One existing way of inserting a valve into a fire hydrant water line or other line without shutting down service proceeds by cutting a hole in the pipe with a known type of hot-tapping hole saw apparatus. A valving apparatus is then added that forces a rubber plunger into the hole. The rubber plunger expands enough to block the line. Withdrawing the plunger unblocks the line.

One problem with the rubber plunger technique is that success of the valving apparatus depends on the internal size and condition of the pipe. In addition, an old, corroded or otherwise damaged and weakened pipe is subject to being broken. Furthermore, pushing a plug through a tapped hole subjects the rubber gate to being cut by the sharp edges of the hole cut in the pipe each time the gate is opened and closed. For those and other reasons that will become more apparent, users need a better way to insert a valve in a water line or other line containing fluid under pressure.

SUMMARY OF THE INVENTION

This invention addresses the concerns outlined above by providing a valve assembly and installation method that function independent of internal size and condition of the existing pipe. A first subassembly (a valve body that assembles over the pipe) includes a bonnet-supporting flange that defines an access opening. A section of the pipe is cut and removed through the access opening to form a gate-receiving gap in the pipe that completely separates the pipe in separate sections. A second subassembly (a bonnet) is then mounted on the bonnet-supporting flange in the access opening where it operates to advance a gate through the gate-receiving gap in the pipe and into fluid-tight sealing engagement of the valve body. Thus, the condition of the pipe does not affect the seal.

To paraphrase some of the more precise language appearing in the claims and introduce the nomenclature used, the invention provides a valve assembly for insertion in a line formed by an existing pipe containing fluid under pressure. The valve assembly includes a first subassembly that forms a valve body and a second subassembly that forms a bonnet. The valve body has opposite first and second ends, a valve body axis extending between the first and second ends, and a bonnet-supporting flange intermediate the first and second ends that defines an access opening facing radially away from the valve body axis. The valve body is adapted to be assembled over the existing pipe so that the pipe extends along the valve body axis between the first and second ends of the valve body and so that a user or other installer can access the pipe within the valve body through the access opening for purposes of cutting and removing a section of the existing pipe in order to form a gate-receiving gap in the pipe.

The bonnet includes a gate and the bonnet is adapted to function as means for moving the gate through the access opening into the valve body, between an open position of the gate in which the first and second ends of the valve body are in fluid communication, and a closed position of the gate in which the gate extends through the gate-receiving gap in the pipe and into fluid-tight engagement of the valve body so that the first and second ends of the valve body are not in fluid communication. The flange-mating portion of the bonnet defines a gate opening through which the gate extends from the bonnet in a fluid-tight fit, and the flange-mating portion of the bonnet fits into the access opening in a fluid-tight fit. That arrangement enables a user to mount the bonnet on the valve body through a temporary isolation valve mounted on the bonnet-supporting flange in order to thereby facilitate insertion of the valve assembly when the existing pipe contains fluid under pressure.

In line with the above, a method of inserting a valve in a line having an existing pipe includes the step of providing the valve body subassembly and the bonnet subassembly described above, together with a temporary isolation valve, pipe-cutting means, and bonnet-mounting means. The method proceeds by (i) assembling the valve body over the existing pipe, (ii) mounting a temporary isolation valve on the bonnet-supporting flange, (iii) cutting and removing a section of the existing pipe through the isolation valve to form the gate-receiving gap in the pipe (iv) installing the bonnet through the isolation valve, and then (v) removing the isolation value up over the bonnet.

Thus, the invention overcomes problems associated with some existing techniques for inserting a valve in a line with a valve assembly and installation method that significantly facilitate the process. The following illustrative drawings and detailed description make the foregoing and other objects, features, and advantages of the invention more apparent.

DESCRIPTION OF THE PREFERRED EMBODIMENTS

FIGS. 1–5 of the drawings show various aspects of a valve assembly 10 constructed according to the invention.

Generally, the valve assembly 10 includes first and second subassemblies referred to in this description as a valve body 11 and a bonnet 12. The valve body 11 extends along a valve body axis 13 between first and second ends 14 and,15 of the valve body 11, and it includes two valve body sections 16 and 17 (e.g., ductile iron, steel, composite material, or other suitable composition) that are adapted to be bolted together or otherwise assembled over an existing pipe 18 having a predetermined outside diameter (OD).

Figure 1:
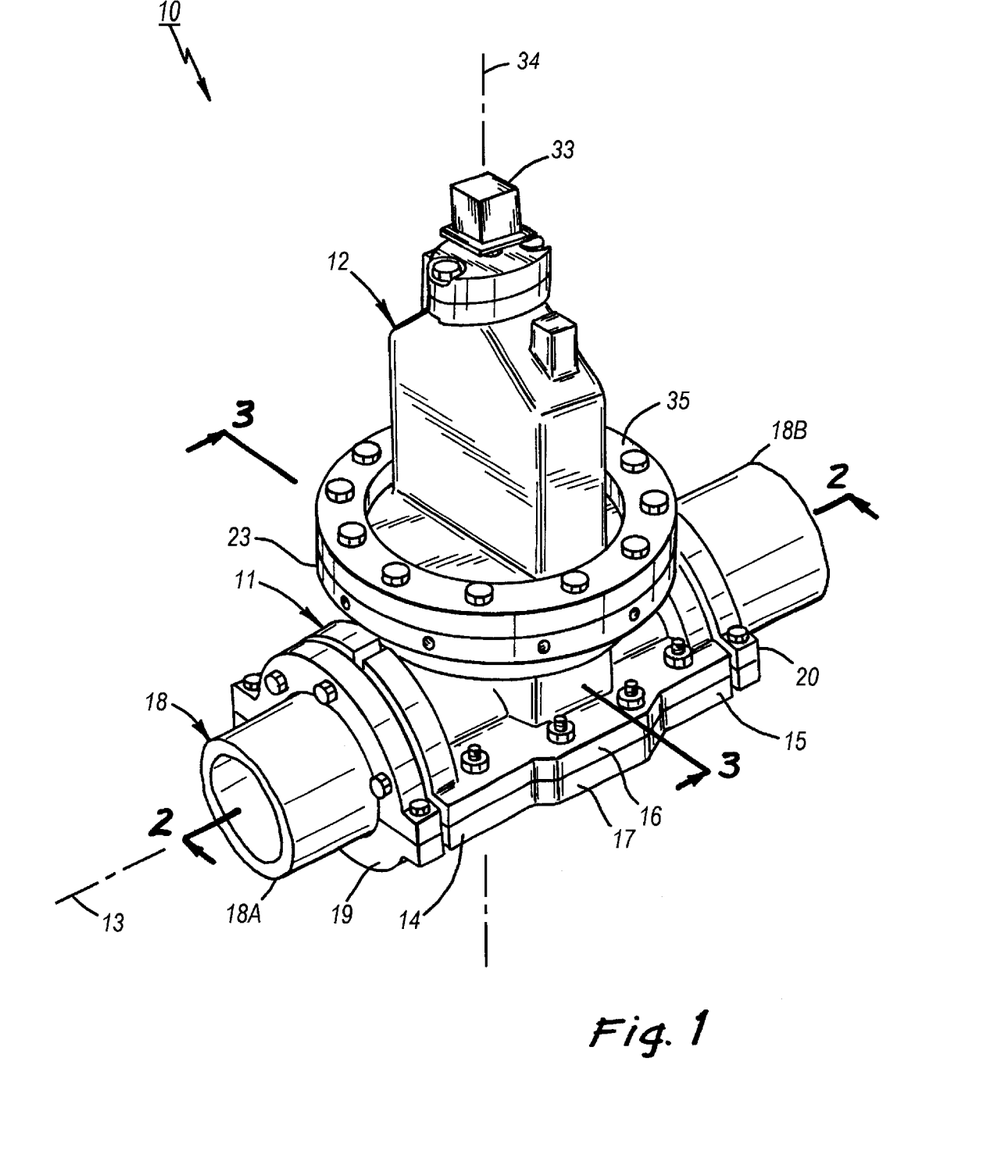
FIG. 1 of the drawings is an isometric view of a valve assembly constructed according for insertion in a line containing fluid under pressure.
Figure 2:
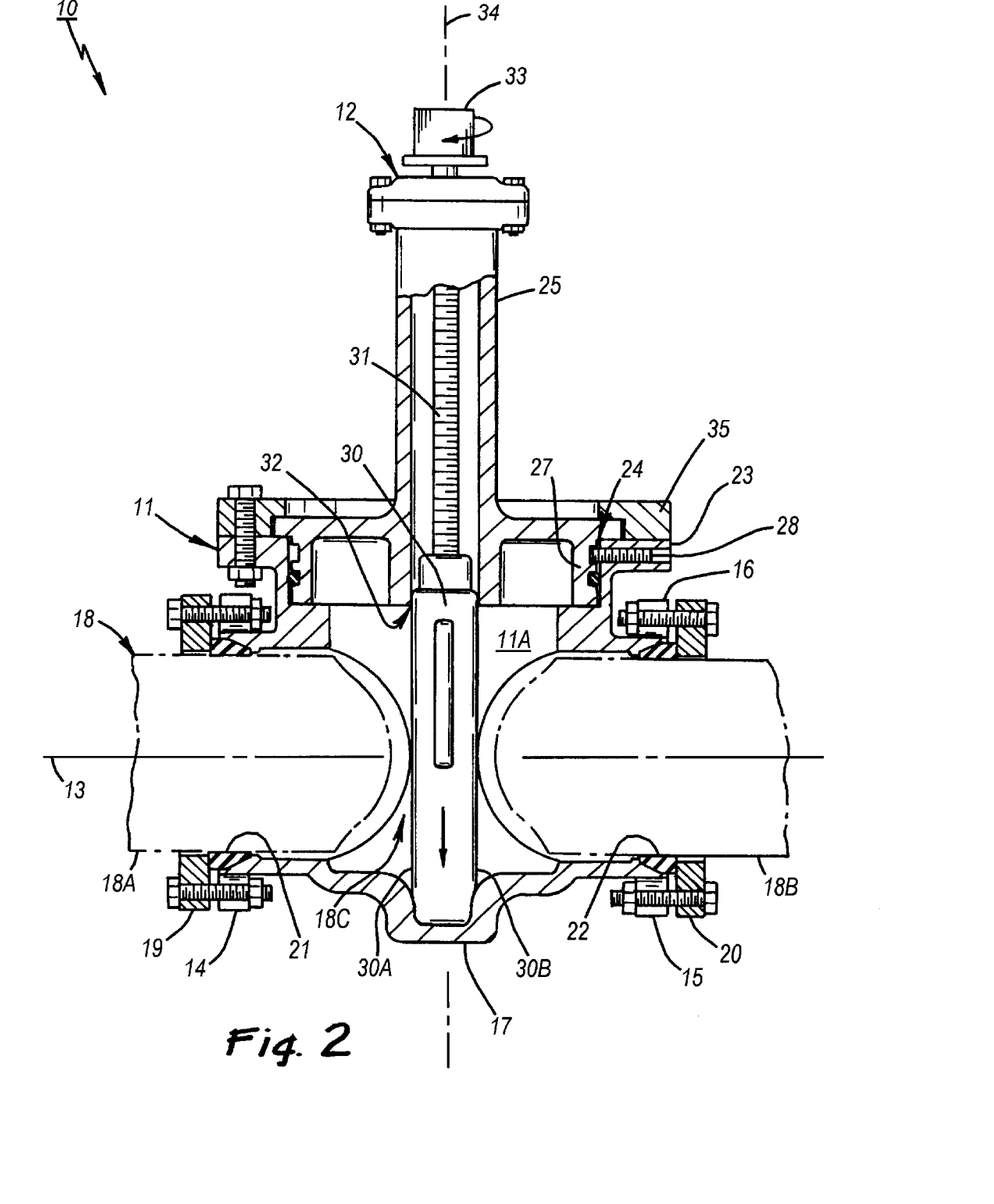
FIG. 2 is a cross sectional elevation view of the valve assembly as viewed in a vertical plane containing a line 2—2 in FIG. 1.
Figure 3:
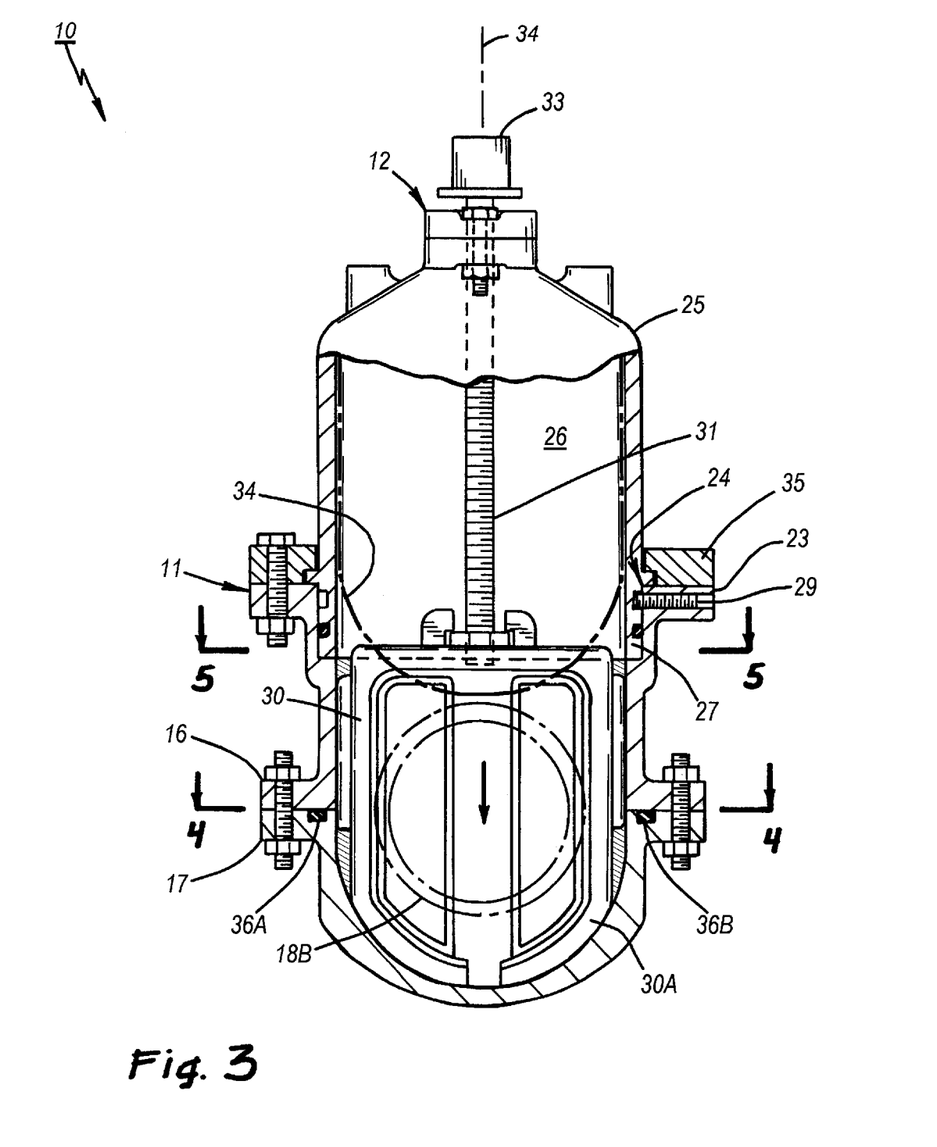
FIG. 3 is a cross sectional elevation view of the valve assembly as viewed in a vertical plane containing a line 3—3 in FIG. 1.
Figure 4:
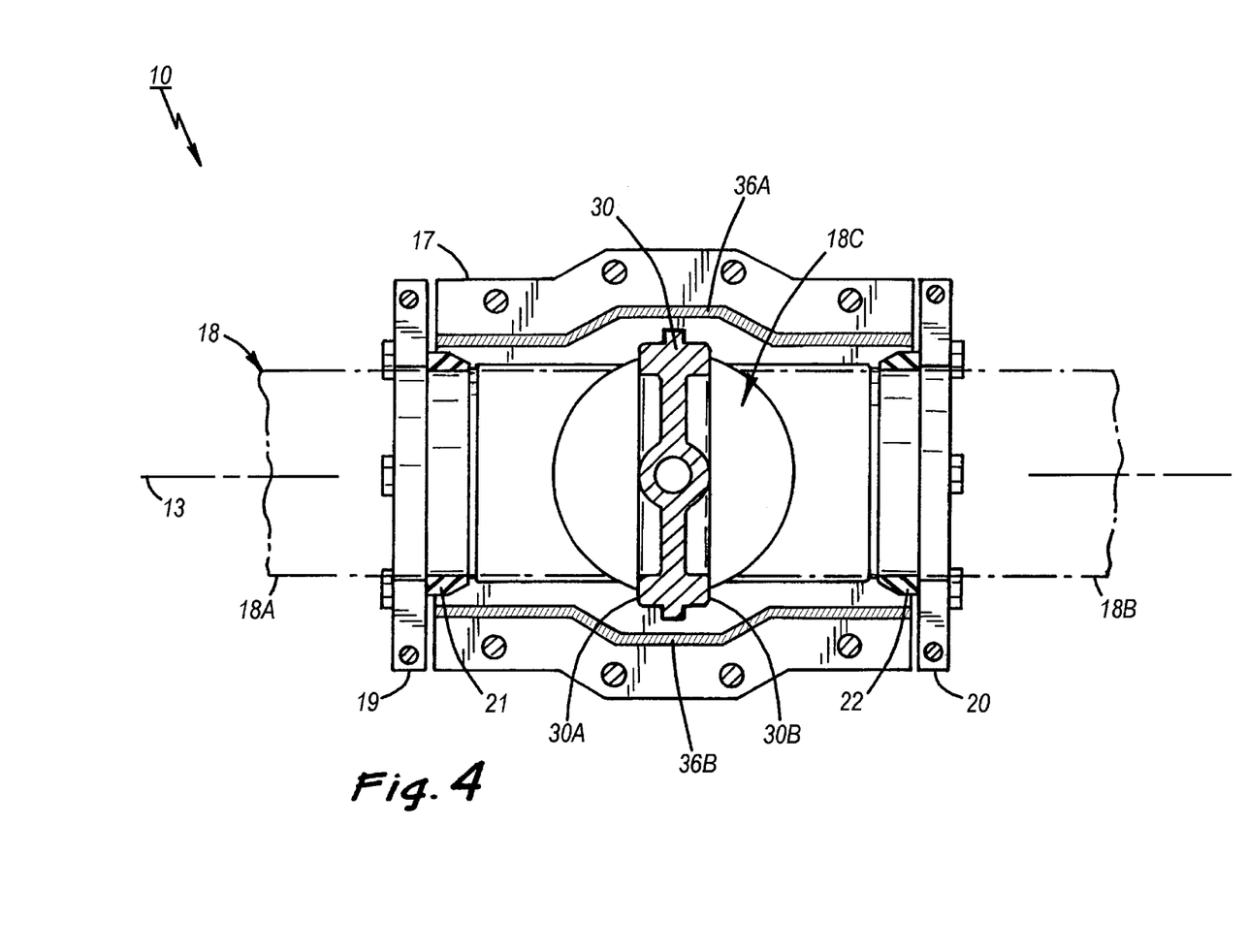
FIG. 4 is a cross sectional plan view of the valve assembly as viewed in a horizontal plane containing a line 4—4 in FIG. 3.
Figure 5:
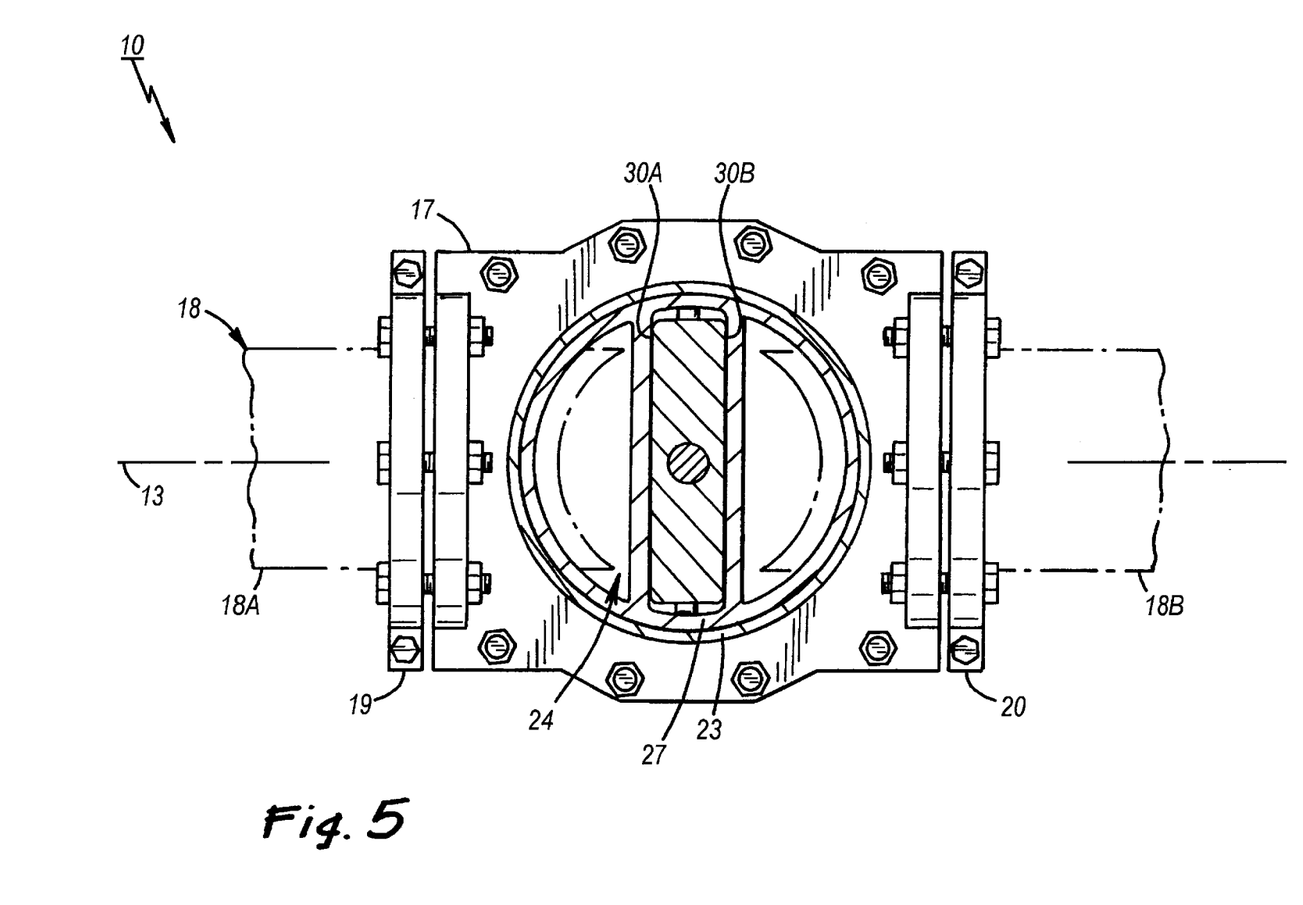
FIG. 5 is a cross sectional plan view of the valve assembly as viewed in a horizontal plane containing a line 5—5 in FIG. 3.

The OD of the six-inch pipe 18 might typically measure about 6.5 inches to 7.75 inches, although the invention works with sixteen-inch OD and even larger pipe. A valve body constructed according to the invention is sized according to the pipe OD with which it will be used. The first and second valve body sections 16 and 17 of the illustrated valve body 11 fit over the six-inch OD of the pipe 18, with the valve body 11 and the pipe 18 disposed coaxially relative to the valve body axis 13. First and second glands 19 and 20 bolt onto the first and second valve body sections 16 and 17 where they bear against first and second split rubber seals 21 and 22 in order to seal the first and second ends 14 and 15 of the valve body 11 on the pipe 18. The glands and rubber seals may take the form of known types of components. So assembled, the valve body 11 combines with the glands 19 and 20 and the seals 21 and 22 in a fluid-tight valve body subassembly over the pipe 18. In other words, they form a fluid-tight chamber (e.g., watertight) encircling the existing pipe 18. Stated another way, the valve body 11 defines a fluid-tight hollow interior.

The valve body 11 includes a bonnet-supporting flange 23 (also referred to herein as a flange portion!. It is bonnet-supporting in that the bonnet 12 is mounted on it and supported by it as described later on. The bonnet-supporting flange 23 defines an access opening 24 that is identified in FIGS. 2, 3, and 5. The access opening 24 faces radially away from the valve body axis 13 and it provides access to the interior chamber 11A defined by the valve body 11. The access opening 24 is large enough to receive a cylindrically shaped cutting element (also referred to herein as a cylindrically shaped hole-cutting element) having an outside diameter no less than the OD of the pipe 18, and the interior chamber 11A (also referred to herein as the hollow interior 11A of the valve body 11) is sufficiently large to enable the user (i.e., the person or persons installing the assembly) to cut all the way through the existing pipe 18 with the cylindrically shaped cutting element. In other words, the access opening 24 is sufficiently large to receive the cylindrically shaped hole-cuttinq element having an outside diameter no less than the predetermined outside diameter of the pipe 18 as the hole-cutting element advances radially relative to the valve body axis through the access opening 24 toward the pipe 18, and the valve body 11 defines a hollow interior 11A that is sufficiently large to receive the cylindrically shaped hole-cutting element as the cylindrically shaped hole-cutting element rotates and advances entirely through the pipe to form a gap in the pipe 18. The user advances the cylindrically shaped cutting element through the access opening 24 in order to cut and remove a section of pipe from the pipe 18 and thereby form a gap in the pipe 18 as discussed later on in this description with reference to FIGS. 6A–6K.

The illustrated access opening 24 is circularly shaped with a diameter somewhat larger than the OD of the pipe 18 (e.g., in order to facilitate use of a cylindrically shaped cutting element having an outside diameter a little larger than the OD of the pipe 18. Cutting the pipe 18 all the way through (i.e., entirely through) that way results in two separate pipe sections 18A and 18B separated by a gate-receiving gap 18C. It is a gate-receiving gap in that it enables a gate (described later on) to be advance to a position between the pipe sections 18A and 18B where the gate blocks fluid flow between the pipe sections.

The bonnet 12 includes a housing 25 that defines a hollow interior 26 of the bonnet 12. The hollow interior 26 is identified in FIG. 3. The bonnet 12 also includes a flange-mating portion 27 of the housing 25 that is shaped and dimensioned to fit into the access opening 24 in a fluid-tight fit. The flange-mating portion 27 may include an 0-ring seal or other suitable means to help effect the fluid-tight fit. Set screws or other suitable means function as means for securing the flange-mating portion 27 within the access opening 24. One such set screw 28 is identified in FIG. 2 and another such set screw 29 is identified in FIG. 3.

In addition, the bonnet 12 includes a gate 30 and a gate-advancing mechanism 31 (e.g., a rotatable threaded stem and nut combination). The gate-advancing mechanism 31 functions as means for enabling a user to advance the gate 30 between open and closed positions of the gate 30. The flange-mating portion 27 defines a gate opening 32 through which the gate 30 extends in a fluid-tight fit. The gate opening 32 is identified in FIG. 2. The gate-advancing mechanism 31 advances and withdraws the gate 30 through the gate opening 32 in response to the user turning a square head portion 33 of the gate-advancing mechanism 31 (e.g., with a wrench or other suitable head-engaging tool). As the square head portion 33 rotates on a rotational axis 34 that is perpendicular to the valve body axis 13, the gate 30 advances or withdraws along the rotational axis 34. The gate 30 is also referred to herein as a moveable valve-stopping element or just valve-stopping element. Using that term, the second subassembly is adapted to be mounted on the flange portion of the valve body after a gap has been cut in the pipe and function as means for selectively stopping the flow of fluid through the valve body with the valve-stopping element by advancing the valve-stopping element radially relative to the valve body axis through the gal in the pipe into fluid-tight engagement of the valve body.

In the closed position of the gate 30 illustrated in FIGS. 2–5, the gate is disposed in the gate-receiving gap 18C, between the pipe sections 18A and 18B, with the gate 30 being in fluid-tight engagement of the valve body 11 and in fluid-tight engagement of the flange-mating portion 27 of the bonnet 12. So disposed, the gate 30 blocks the flow of fluid between the pipe sections 18A and 18B. Fluid cannot flow around the gate 30 via the hollow interior 26 of the housing 25 because at least one (preferably both) of opposite faces 30A and 30B of the gate 30 contacts the flange-mating portion 27 of the bonnet 12. In the open position of the gate 30, the gate 30 does not block the flow of fluid between the pipe sections 18A and 18B because the gate 30 is withdrawn from the closed position as depicted by the phantom line 34 in FIG. 3.

The illustrated gate 30 is fabricated from ductile iron in the desired shape and then a rubber coating is bonded on using known transfer mold or compression mold techniques. The rubber coating helps effect the desired fluid-tight seal between the gate 30 and the valve body 11 and between the gate 30 and the flange-mating portion 27 of the bonnet 12. As an idea of size, the illustrated gate 30 (for use with six-inch pipe) measures about 9.0 inches wide (parallel to the gate faces 30A and 30B and perpendicular to the rotational axis 34). The access opening 24 is large enough to pass the gate 30, and the flange-mating portion 27 is sized to fit snugly within the access opening 24. After mounting the bonnet 12 on the valve body 11, the user bolts a retainer ring 35 (FIGS. 1–3) onto the bonnet-supporting flange 23 to help secure the bonnet 12 in place. The result is a solid, long-term, permanent valve installation.

Recapitulating, the valve body 11 is adapted to be assembled over the existing pipe 18 so that the pipe 18 extends along the valve body axis 13 between the first and second ends 14 and 15 of the valve body 11 and so that the user can access the pipe 18 within the valve body 11 through the access opening 24 for purposes of cutting and removing a section of the existing pipe 18 in order to form the gate-receiving gap 18C in the pipe 18 that results in spaced apart first and second pipe sections 18A and 18B. The bonnet 12 is adapted to function as means for moving the gate 30 through the access opening 24 into the interior chamber 11A of the valve body 11, between an open position of the gate 30 in which the first and second ends 14 and 15 of the valve body 11 (i.e., the two pipe sections 18A and 18B) are in fluid communication and a closed position of the gate 30 in which the gate 30 extends through the gate-receiving gap 18C and into fluid-tight engagement of the valve body 11 such that the first and second ends 14 and 15 of the valve body 11 are not in fluid communication. The flange-mating portion 27 of the bonnet 12 defines a gate opening 32 through which the gate 30 extends from the bonnet 12 in a fluid-tight fit, and the flange-mating portion 27 of the bonnet 11 fits into the access opening 32 in a fluid-tight fit, thereby enabling the user to mount the bonnet 12 on the valve body 11 through a temporary isolation valve mounted on the bonnet-supporting flange 27 (as described below) in order to facilitate insertion when the existing pipe 18 contains fluid under pressure.

Figures 6A, 6B, 6C:
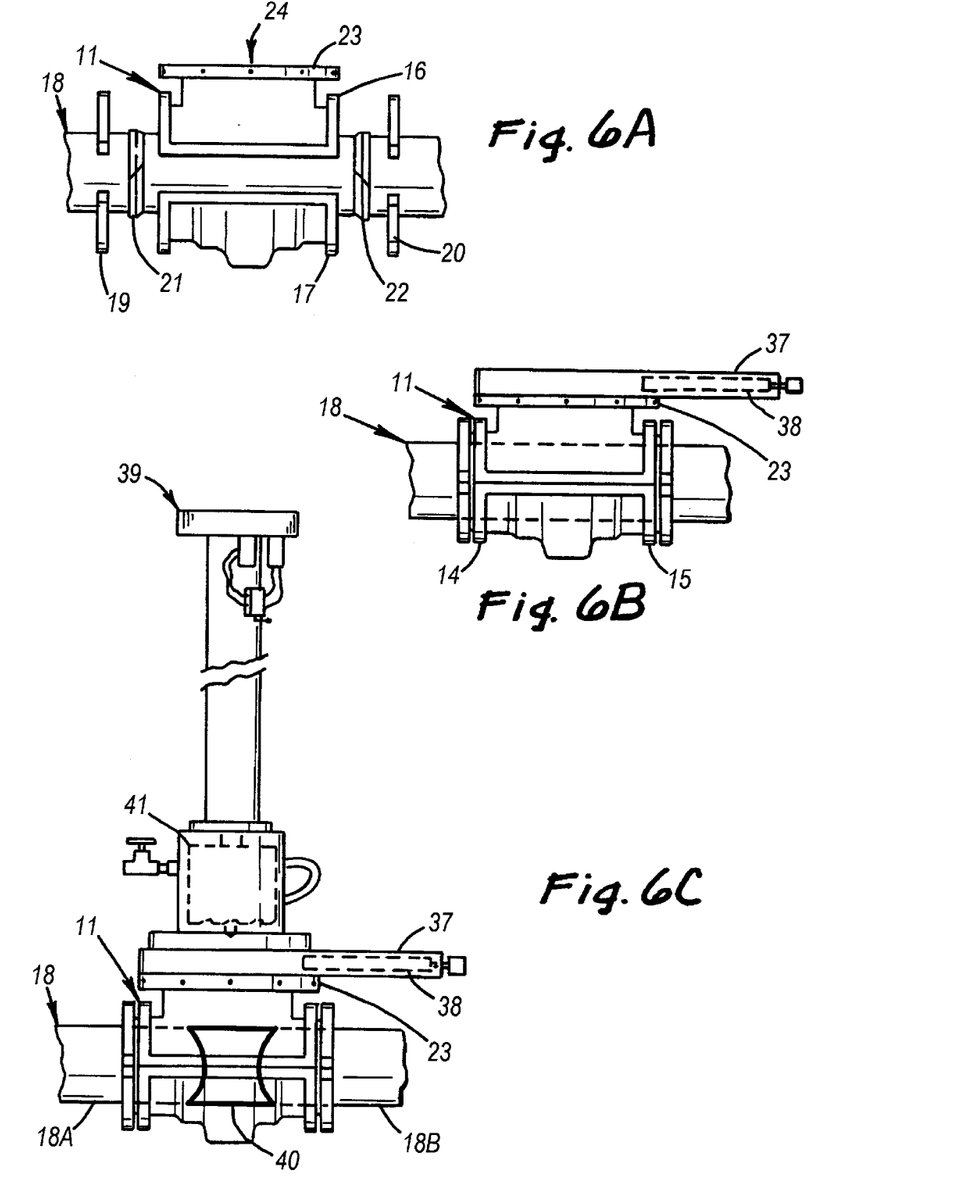
FIG. 6A through 6K are diagrammatic representations of various steps of the installation methodology used to install the valve assembly in an existing line.

FIGS. 6A–6K illustrate valve installation diagrammatically in further detail. The existing pipe 18 represents an existing line carrying fluid (e.g., water or natural gas) under pressure. The two valve body sections 16 and 17 are assembled over the pipe 18 and bolted together as depicted in FIG. 6A with rubber gaskets 36A and 36B (visible in FIGS. 3 and 4) being included between the two valve body sections 16 and 17. The first and second split rubber seals 21 and 22 are then forced between the pipe 18 and the two valve body sections 16 and 17 (in the positions illustrated in FIGS. 2–4) by assembling the glands 19 and 20 over the pipe 18 and bolting them to the two valve body sections 16 and 17. The glands 19 and 20 may take the form of known types of components that include known-types of restraining devices (not shown) built into them to hold the existing pipe 18 in place. When compressed by the glands 19 and 20, the first and second split rubber seals 21 and 22 result in a fluid-tight seal between the pipe 18 and the valve body 11, and that results in a fluid-tight chamber 11A within the valve body 11 once the access opening 24 is sealed as subsequently explained.

Installation includes mounting what is referred to herein as an isolation valve 37 on the bonnet-supporting flange 23 in a fluid-tight fit as depicted in FIG. 6B. The isolation valve 37 may take the form of a known type of gate valve having a gate 38 that can be closed to seal off the is access opening 24 when desired during installation, and be opened to expose the access opening 24 in the bonnet-supporting flange 23. With the gate 38 in the open position depicted in FIG. 6B, the user can perform additional installation steps through the isolation valve 37. Preferably, the isolation valve 37 is removed after installation is complete as explained later one.

With the isolation valve 37 mounted on the bonnet-supporting flange 23, a tapping machine referred to herein as a hole saw apparatus 39 is mounted on the isolation valve 37 in a fluid-tight fit and used to cut out and remove a section 40 of the pipe 18 (identified with a bold outline in FIG. 6C). The hole saw apparatus 39 may take the form of a known type of tool that functions as pipe-cutting means. It is adapted to be mounted on the isolation valve 37 and functions as means for cutting and removing t he whole section 40 of the existing pipe 18 through the isolation valve 37 and the access opening 24 in order to form the gate-receiving gap 18C.

Figures 6D, 6E, 6F:
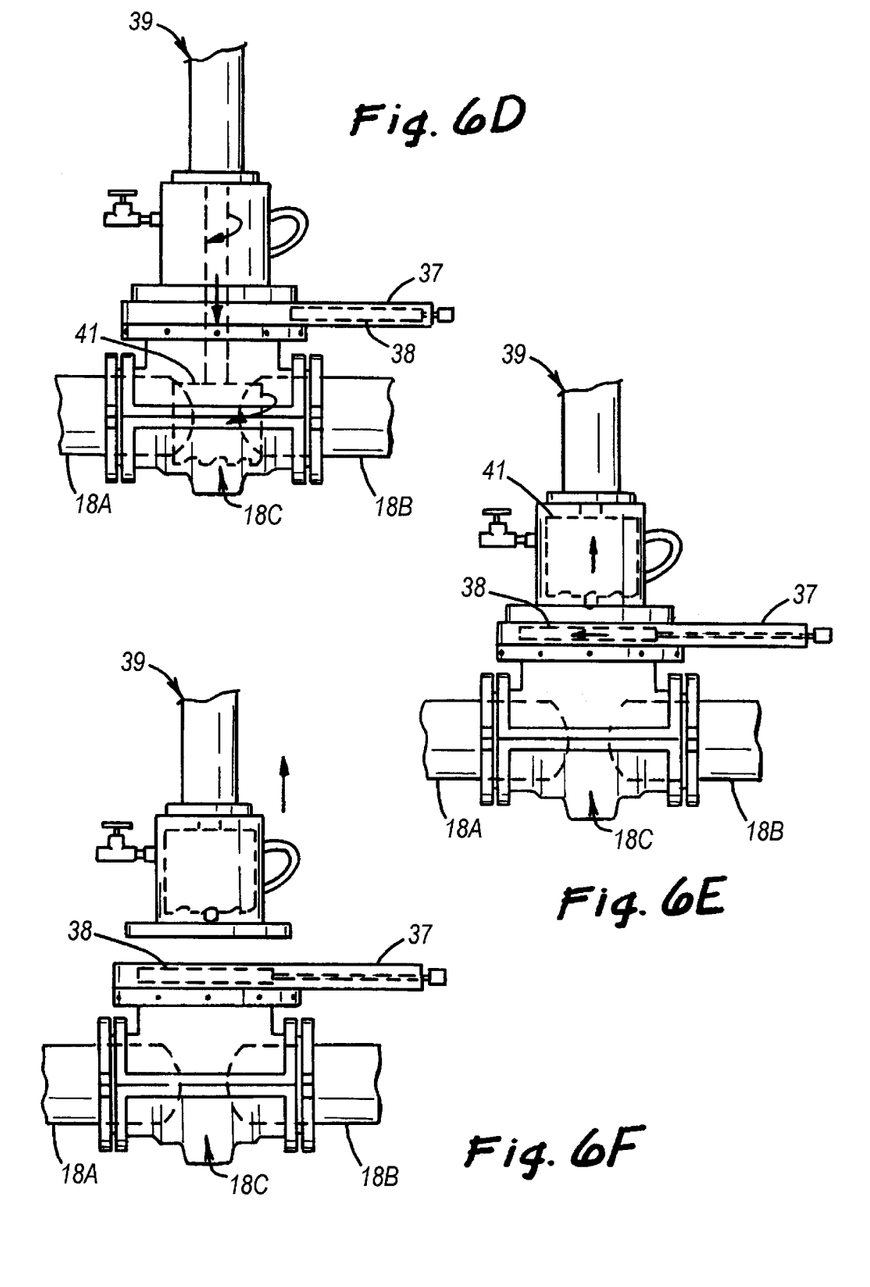

Cutting the pipe 18 with such a hole saw apparatus is sometimes referred to as "hot tapping." It is a known type of technology that is familiar to one of ordinary skill in the art. The hole saw apparatus 39 includes a cylindrically shaped cutting element 41 (e.g., a readily available to cutting tip) having an outside diameter no less (preferably greater than) than the OD of the pipe 18. The hole saw apparatus 39 rotates the cutting element 41 as depicted in FIG. 6D (e.g., powered by a gasoline, electrical, hydraulic, or air engine) while advancing it through the isolation valve 37, through the access opening 24, and through the pipe 18 (e.g., in response to the user cranking a handwheel portion of the apparatus 39), thereby severing the pipe 18 by cutting out the section 40. Doing so forms the gate-receiving gap 18C between the two separate pipe sections 18A and 18B that is identified in FIGS. 6D–6K.

After the section 40 is cut, the cutting element 41 is withdrawn out of the valve body 11 through the access opening 24 and the isolation valve 37, along with the section 40 as depicted by FIG. 6E. The section 40 may be held by a pilot drill portion of the cutting element 41 that includes a known type of retention device so that the section 40 is withdrawn with the cutting element 41. Those details are known to one of ordinary skill in the art.

Figures 6G, 6H, 6I:
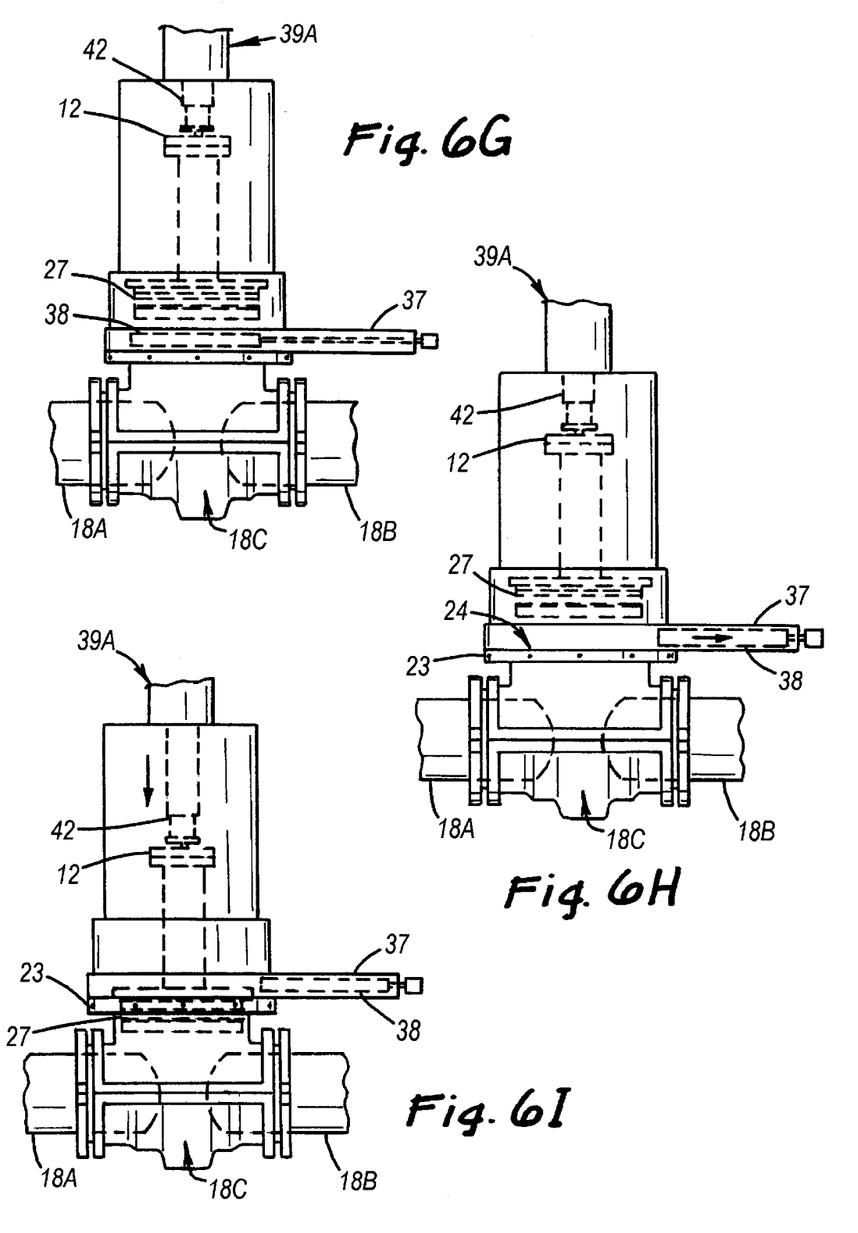

Next, the user closes the gate 38 of the isolation valve 37 and removes the hole saw apparatus 39 from the bonnet-supporting flange 23 as depicted by FIG. 6F. The cutting element 41 is then removed from the hole saw apparatus 39, a bonnet-holding device 42 is added to form a bonnet-mounting apparatus 39A (FIGS. 6G, 6H, and 6I), and the bonnet-mounting apparatus 39A is mounted on the bonnet-supporting flange 23 in a fluid-tight fit. Designation by reference numeral 39A indicates that it is a modified version of the original hole saw apparatus 39, now having the bonnet-holding device 42 (identified in FIGS. 6G, 6H, and 6I). The bonnet-holding device 42 grips and holds the bonnet 12 while the bonnet-mounting apparatus 39A advances the bonnet 12 along the rotational axis identified in FIGS. 1–3 (after the gate 38 is re-opened as depicted in FIG. 6H), forcing the flange-mating portion 27 of the bonnet 12 into position in the access opening 24 defined by the bonnet-supporting flange 23 (identified in FIG. 6H). The user secures the flange-mating portion 27 with the set screws 28 and 29 (and others) mention previously with reference to FIGS. 2 and 3. Of course, any of various other forms of securing mechanisms may be used instead, including a mechanically sliding restraint that engages the flange-mating portion 27. Thus, the bonnet-mounting apparatus 39A functions as bonnet-mounting means that is adapted to be mounted on the isolation valve 37. There, it functions as means for mounting the bonnet 12 on the bonnet-supporting flange 23 through the isolation valve 37. Of course, a entirely different apparatus can be used instead for mounting the bonnet 12 without departing from the invention. The above procedure makes use of the hole saw apparatus 39 for pipe-cutting and, after modification, for bonnet-mounting purposes.

Figure 6J:
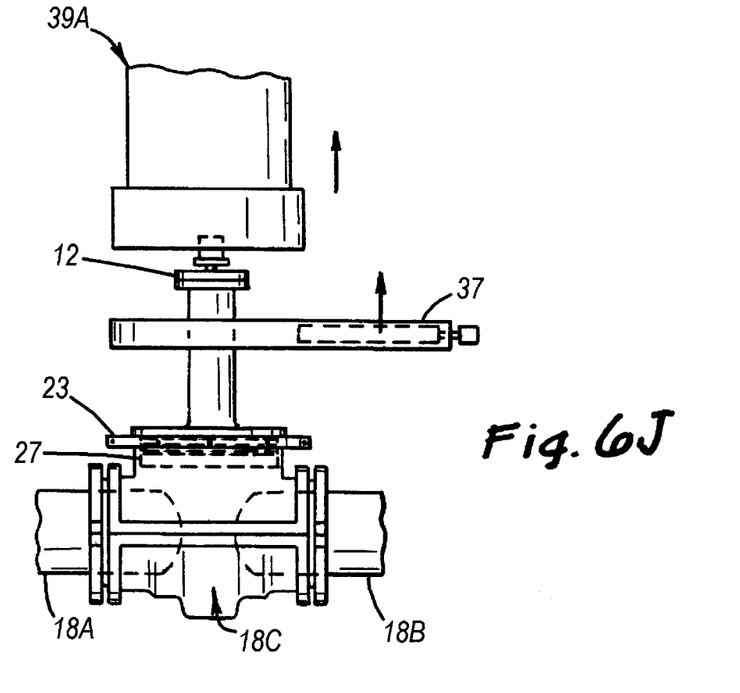
Figure 6K:
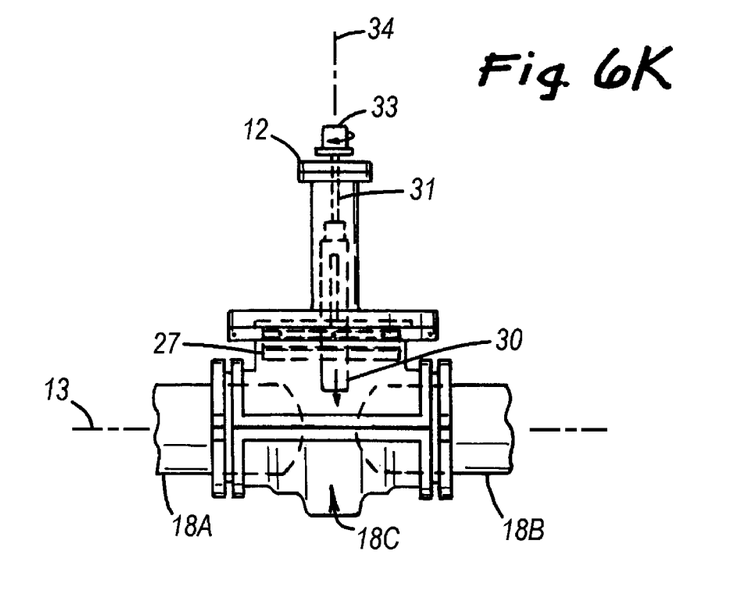

After the bonnet 12 is mounted, the bonnet-mounting apparatus 39A is removed from the isolation valve 37. The isolation valve 37 is also removed from the bonnet-supporting flange 23, up and over the bonnet 12 as depicted in FIG. 6J. Finally, the retaining ring 35 is bolted onto the bonnet-supporting flange 23 as depicted in FIG. 6K to result in a valve assembly installation according to the invention. The user or worker desiring to open and/or close the valve, accesses and rotates the square head 33 (e.g., clockwise to close and counterclockwise to open).

To summarize the above-described methodology, a method of inserting a valve in a line includes the step of providing the above-described (i) first or valve body subassembly, (ii) second or bonnet subassembly, (iii) isolation valve, (iv) pipe-cutting means, and (v) bonnet-mounting means. The method proceeds by assembling the valve body subassembly over the pipe, mounting the isolation valve on the flange, cutting and removing a section of pipe by using the pipe-cutting means through the isolation valve, and mounting the bonnet subassembly on the flange by using the bonnet-mounting means through the isolation valve (thereby allowing the valve body to become part of the gate sealing surface).

Thus, the method of this invention removes a whole section of the existing pipe in order to allow the gate to seat on its mating valve body casting. The valve structure allows that to be done. Doing so enable isolation of most any pipeline whether or not there is a gross amount of build up on the pipe interior and/or the pipe has an unusual pipe size and wall thickness. Existing valve insertion techniques cut just a hole in the pipe in order to seat a gate against the interior of the existing pipe, whereas the present invention cuts entirely through the existing pipe, thereby resulting in a true valve. In addition, the valve assembly of this invention results in a mechanical seal around the existing pipe that contains fluid in the event of breakage of the existing pipe. Although an exemplary embodiment has been shown and described, one of ordinary skill in the art may make many changes, modifications, and substitutions without necessarily departing from the spirit and scope of the invention.

What is claimed is:

1. A valve assembly for insertion in a line formed by an existing pipe of predetermined outside diameter containing fluid under pressure, the valve assembly comprising:

a first subassembly that includes a valve body having opposite first and second ends, a valve body axis extending between the first and second ends, and a bonnet-supporting flange intermediate the first and second ends that defines an access opening facing radially away from the valve body axis, the valve body being adapted to be assembled over the existing pipe so that the pipe extends along the valve body axis between the first and second ends of the valve body and so that a user can access the pipe within the valve body through the access opening for purposes of cutting and removing a section of the existing pipe in order to form a gate-receiving gap in the pipe; and a second subassembly that includes a bonnet having a gate and a flange-mating portion, the bonnet being adapted to function as means for moving the gate through the access opening into the valve body, between an open position of the gate in which the first and second ends of the valve body are in fluid communication and a closed position of the gate in which the gate extends through the gate-receiving gap in the pipe and into fluid-tight engagement of the valve body such that the first and second ends of the valve body are not in fluid communication;

wherein the flange-mating portion of the bonnet defines a gate opening through which the gate extends from the bonnet in a fluid-tight fit; and wherein the flange-mating portion of the bonnet fits into the access opening in a fluid-tight fit;

thereby enabling a user to mount the bonnet on the valve body through a temporary isolation valve mounted on the bonnet-supporting flange in order to facilitate insertion of the valve assembly when the existing pipe contains fluid under pressure;

wherein said first and second ends of the valve body are not connected to each other solely by valve body structure that is rotatable about the valve body axis independent of the first and second ends;

wherein said first and second ends of the valve body are not rotatable about the valve body axis relative to each other;

wherein said bonnet-supporting flange is not rotatable about the valve body axis relative to the first and second ends;

wherein the access opening is sufficiently large to receive a hole-cutting element having an outside diameter no smaller than the predetermined outside diameter of the pipe as the hole-cutting element advances radially relative to the valve body axis through the access opening toward the pipe;

wherein the valve body defines a hollow interior that is sufficiently large to receive the hole-cutting element as the hole-cutting element rotates and advances radially entirely through the pipe to form the gate-receiving gap in the pipe;

wherein the gate is adapted to extend, in the closed position of the gate, through the gate-receiving gap in the pipe and into direct fluid-tight engagement of the valve body without needing to rely on contact with the pipe to effect a seal.

2. A valve assembly as recited in claim 1, wherein the bonnet-supporting flange includes means for securing the flange-mating portion of the bonnet within the access opening.

3. A valve assembly as recited in claim 1, wherein the gate is a rubber-covered metal member.

4. A valve assembly as recited in claim 1, wherein the gate includes opposite first and second faces such that with the gate in the closed position, the first face of the gate faces the first end of the valve body and the second face of the gate faces the second end of the valve body and such that at least one of the first and second faces contacts the flange-mating portion of the bonnet in fluid-tight sealing engagement of the flange-mating portion when the gate is in the closed position.

5. A valve assembly as recited in claim 1, wherein the gate has a width that is no less than the predetermined outside diameter of the pipe.

6. A valve installation, comprising:

a pipe having a predetermined outside diameter;

a first subassembly that includes a valve body having opposite first and second ends, a valve body axis extending between the first and second ends, and a bonnet-supporting flange intermediate the first and second ends that defines an access opening facing radially away from the valve body axis, the valve body having been assembled over the pipe so that the pipe extends along the valve body axis between the first and second ends of the valve body and so that a installer was able to access the pipe within the valve body through the access opening for purposes of cutting and removing a section of the pipe in order to form a gate-receiving gap in the pipe; and a second subassembly that includes a bonnet having a gate with a width that is no less than the predetermined outside diameter of the pipe and a flange-mating portion, the bonnet being adapted to function as means for moving the gate through the access opening into the valve body, between an open position of the gate in which the first and second ends of the valve body are in fluid communication and a closed position of the gate in which the gate extends through the gate-receiving gap in the pipe and into fluid-tight engagement of the valve body such that the first and second ends of the valve body are not in fluid communication;

wherein the flange-mating portion of the bonnet defines a gate opening through which the gate extends from the bonnet in a fluid-tight fit and the flange-mating portion of the bonnet fits into the access opening in a fluid-tight fit;

wherein said first and second ends of the valve body are not connected to each other solely by valve body structure that is rotatable about the valve body axis independent of the first and second ends;

wherein said first and second ends of the valve body are not rotatable about the valve body axis relative to each other; and wherein said bonnet-supporting flange is not rotatable about the valve body axis relative to the first and second ends;

wherein the gate is adapted to extend, in the closed position of the gate, through the gate-receiving gap in the pipe and into direct fluid-tight engagement of the valve body without needing to rely on contact with the pipe to effect a seal.

* * * * *